United States Patent
Dumas et al.

(10) Patent No.: US 9,697,658 B1
(45) Date of Patent: Jul. 4, 2017

(54) WIRELESS ACCESS CONTROL SYSTEM INCLUDING CLOSED DOOR POSITION AND INTERIOR AREA REMOTE ACCESS WIRELESS COMMUNICATIONS DEVICE BASED LOCK SWITCHING AND RELATED METHODS

(71) Applicant: Unikey Technologies Inc., Orlando, FL (US)

(72) Inventors: Philip C. Dumas, Orlando, FL (US); Dirk Wyckoff, State College, PA (US)

(73) Assignee: UNIKEY TECHNOLOGIES INC., Orlando, FL (US)

(*) Notice: Subject to any disclaimer, the term of this patent is extended or adjusted under 35 U.S.C. 154(b) by 0 days.

(21) Appl. No.: 14/981,151

(22) Filed: Dec. 28, 2015

(51) Int. Cl.
*G07C 9/00* (2006.01)
*H04B 17/318* (2015.01)

(52) U.S. Cl.
CPC ........ *G07C 9/00111* (2013.01); *H04B 17/318* (2015.01); *G07C 9/00174* (2013.01); *G07C 9/00309* (2013.01)

(58) Field of Classification Search
CPC ............... E05B 47/00; G07C 9/00174; G07C 2009/00261; G07C 9/00309; G07C 9/00111; G07C 2209/64
See application file for complete search history.

(56) References Cited

U.S. PATENT DOCUMENTS

| | | | |
|---|---|---|---|
| 5,820,177 A | 10/1998 | Moon | |
| 5,987,818 A | 11/1999 | Dabideen | |
| 6,615,629 B2 | 9/2003 | Bates et al. | |
| 7,262,518 B2 | 8/2007 | Nagano et al. | |
| 7,336,151 B2 | 2/2008 | Ueda et al. | |
| 7,388,467 B2 | 6/2008 | Fisher et al. | |
| 7,515,033 B2 | 4/2009 | Roosli et al. | |
| 7,548,151 B2 | 6/2009 | Roosli et al. | |
| 7,999,656 B2 | 8/2011 | Fisher | |
| 8,054,158 B2 | 11/2011 | Nakashima | |
| 8,531,269 B2 | 9/2013 | Nagao et al. | |
| 8,717,142 B2 | 5/2014 | Nagao et al. | |

(Continued)

FOREIGN PATENT DOCUMENTS

| | | |
|---|---|---|
| CN | 203795974 U | 8/2014 |
| KR | 20030083538 A | 10/2003 |
| WO | 2013024202 A1 | 2/2013 |

*Primary Examiner* — Thomas Alunkal
(74) *Attorney, Agent, or Firm* — Allen, Dyer, Doppelt & Gilchrist, P.A. Attorneys at Law

(57) ABSTRACT

A wireless access control system may include a remote access wireless communications device and a lock assembly to be mounted on a door. The lock assembly may include a lock, a door position sensor, interior and exterior directional antennas, lock wireless communications circuitry, a touch sensor, and a lock controller. The lock controller may be configured to unlock the lock based upon the touch sensor, determine when the door is closed after being opened based upon the door position sensor, determine whether the remote access wireless device is in an interior or an exterior based upon the directional antennas, switch the lock to the locked position when the door is closed and when the remote access wireless device is in the interior, and not switch the lock to the locked position when the door is closed and when the remote access wireless device is in the exterior.

21 Claims, 6 Drawing Sheets

(56) References Cited

U.S. PATENT DOCUMENTS

| | | |
|---|---|---|
| 8,937,526 B2 | 1/2015 | Chandler, Jr. |
| 2003/0214384 A1 | 11/2003 | Milo |
| 2006/0164208 A1 | 7/2006 | Schaffzin et al. |
| 2008/0174403 A1 | 7/2008 | Wolpert et al. |
| 2012/0127317 A1* | 5/2012 | Yantek .................. G01V 8/14 348/156 |
| 2012/0280790 A1 | 11/2012 | Gerhardt et al. |
| 2013/0099893 A1* | 4/2013 | Kulinets ........... G07C 9/00309 340/5.61 |
| 2013/0237193 A1 | 9/2013 | Dumas et al. |
| 2013/0241694 A1* | 9/2013 | Sharma ................ G08C 17/02 340/5.64 |
| 2014/0022054 A1 | 1/2014 | Bliding et al. |
| 2014/0049361 A1 | 2/2014 | Ahearn et al. |
| 2014/0049367 A1 | 2/2014 | Ahearn et al. |
| 2014/0049369 A1 | 2/2014 | Ahearn et al. |
| 2014/0077929 A1* | 3/2014 | Dumas .............. G07C 9/00571 340/5.61 |
| 2014/0125453 A1* | 5/2014 | McIntyre ........... H04L 63/0853 340/5.7 |
| 2014/0292481 A1 | 10/2014 | Dumas et al. |
| 2014/0339024 A1* | 11/2014 | Tyni .................... B66B 5/0006 187/393 |
| 2014/0340196 A1 | 11/2014 | Myers et al. |
| 2015/0061830 A1 | 3/2015 | Yamane et al. |
| 2015/0070136 A1 | 3/2015 | Kameyama et al. |
| 2015/0116082 A1 | 4/2015 | Cregg et al. |
| 2015/0211259 A1 | 7/2015 | Dumas et al. |
| 2015/0213658 A1 | 7/2015 | Dumas et al. |
| 2015/0213663 A1 | 7/2015 | Dumas et al. |
| 2016/0307385 A1* | 10/2016 | Arfwedson ........ G07C 9/00309 |

* cited by examiner

WIRELESS ACCESS CONTROL SYSTEM INCLUDING CLOSED DOOR POSITION AND INTERIOR AREA REMOTE ACCESS WIRELESS COMMUNICATIONS DEVICE BASED LOCK SWITCHING AND RELATED METHODS

TECHNICAL FIELD

The present disclosure is directed to the field of electronics, and more particularly, to wireless access control and related methods.

BACKGROUND

Protecting or securing access to an area may be particularly desirable. For example, it is often desirable to secure a home or business. One way of securing access to an area is with a mechanical lock. A mechanical lock typically accepts a key, which may move a deadbolt or enable a door handle to be operated.

It may be desirable to increase user convenience with respect to a mechanical lock. A passive keyless entry (PKE) system may provide an increased level of convenience over a standard lock and key, for example, by providing the ability to access a secure area without having to find, insert, and turn a traditional key. For example, a user may access a secure area using a remote access device, such as, for example, a FOB or mobile wireless communications device. In a PKE system, access may be provided to the secure area without pressing a button or providing other input to the remote device, thus making it passive.

U.S. Patent Application Publication No. 2014/0340196 to Myers et al. discloses an access control system via direct and indirect communications. More particularly, Myers et al. discloses a lock assembly communicating with a mobile device and a gateway to communicate with the lock. Operating commands such as lock and unlock are communicated directly from the mobile device or indirectly after confirming, for example, using GPS coordinates of the mobile device.

U.S. Patent Application Publication No. 2012/0280790 to Gerhardt et al. is directed to a system for controlling a locking mechanism using a portable electronic device. More particularly, Gerhardt et al. discloses using a web service to authenticate a portable electronic device, detecting the proximity of the portable electronic device to the lock, and issuing a command for receipt by the lock from the web service or portable electronic device.

U.S. Patent Application No. 2006/0164208 to Schaffzin et al. is directed to a universal hands free key and lock system. A universal key that transmits an ID to a lock unit. The lock unit has a range limited reader. The lock unit detects the transmitted ID and based thereon operates the lock.

SUMMARY

A wireless access control system may include a remote access wireless communications device, and a lock assembly to be mounted on a door remotely from the remote access wireless communications device. The lock assembly may include a lock switchable between locked and unlocked positions, a door position sensor, interior and exterior directional antennas, lock wireless communications circuitry coupled to the interior and exterior directional antennas, a touch sensor, and a lock controller coupled to the lock, the door position sensor, the lock wireless communications circuitry, and the touch sensor. The lock controller may be configured to unlock the lock based upon the touch sensor to permit a user to open the door, determine when the door is closed after being opened based upon the door position sensor, and determine whether the remote access wireless communications device is in an interior area or an exterior area based upon the interior and exterior directional antennas. The lock controller may also be configured to switch the lock to the locked position when the door is closed and when the remote access wireless device is determined to be in the interior area, and not switch the lock to the locked position when the door is closed and when the remote access wireless communications device is determined to be in the exterior area. Accordingly, the lock controller may not lock the lock when the remote access wireless device is in the exterior area and lock the lock when the remote access wireless device is in the interior areas, for example, which may provide additional user conveniences while maintaining security.

The lock controller may be configured to determine whether the remote access wireless device is in the interior area or the exterior area based upon a received signal strength indicator (RSSI) from the interior and exterior directional antennas, for example. The lock controller may be configured to switch the lock to the locked position when the remote access wireless device is determined to be in the interior area after being in the exterior area.

The touch sensor may include a physical-touch sensor configured to sense physical contact with the user. The touch sensor may include a proximity-based touch sensor configured to sense a proximity of the user thereto, for example.

The door position sensor may include an accelerometer. The door position sensor may include a magnetometer, for example.

The remote access wireless communications device may include remote access wireless communications circuitry and a remote access controller coupled thereto. The remote access controller may be configured to communicate via the remote access wireless communications circuitry with the lock wireless communications circuitry for switching the lock between the locked and unlocked positions.

A method aspect is directed to a method of controlling access in a wireless access control system that includes a remote access wireless communications device, and a lock assembly to be mounted on a door remotely from the remote access wireless communications device. The lock assembly includes a lock switchable between locked and unlocked positions, a door position sensor, interior and exterior directional antennas, lock wireless communications circuitry coupled to the interior and exterior directional antennas, a touch sensor, and a lock controller coupled to the lock, the door position sensor, the lock wireless communications circuitry, and the touch sensor. The method includes using the lock controller to unlock the lock based upon the touch sensor to permit a user to open the door, determine when the door is closed after being opened based upon the door position sensor, and determine whether the remote access wireless device is in an interior area or an exterior area based upon the interior and exterior directional antennas. The method also includes using the lock controller to switch the lock to the locked position when the door is closed and when the remote access wireless device is determined to be in the interior area, and not switch the lock to the locked position when the door is closed and when the remote access wireless device is determined to be in the exterior area.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to indicate similar elements in alternative embodiments.

Figure 1:
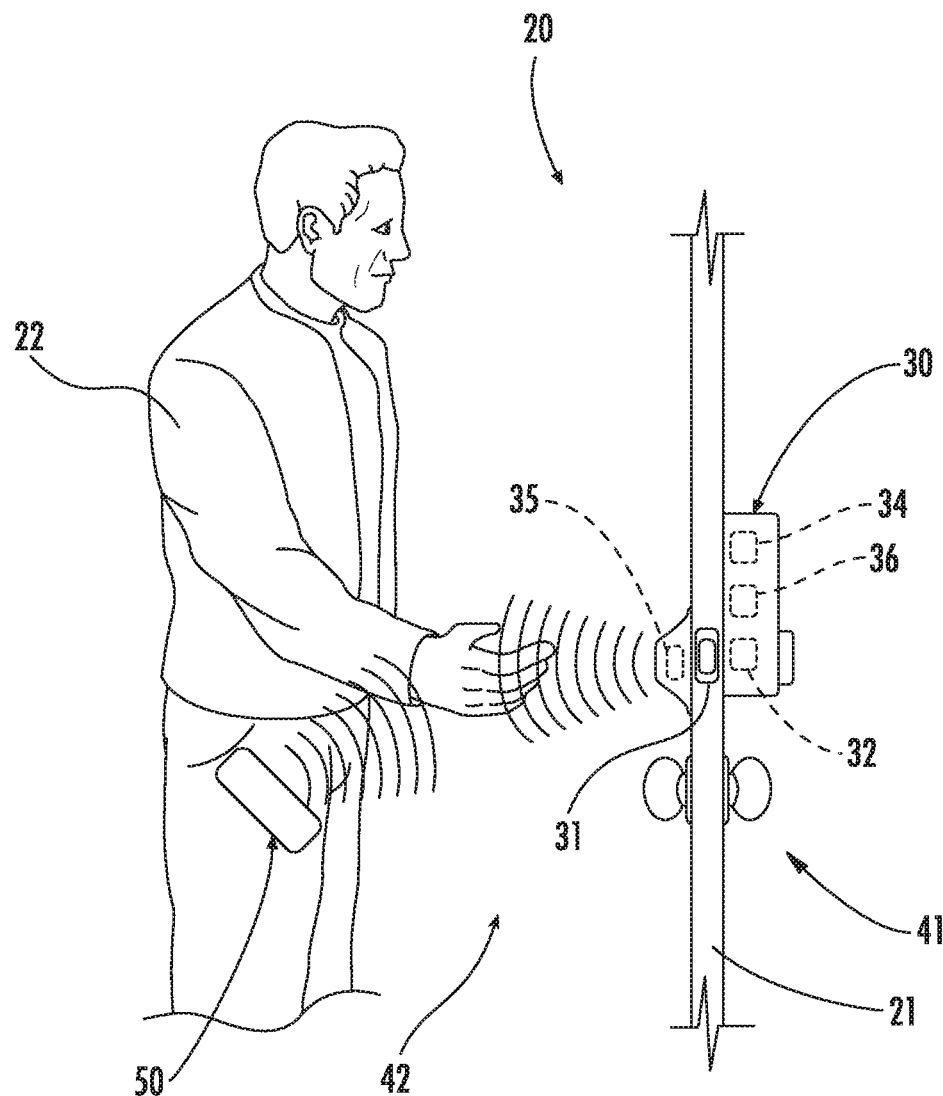
FIG. 1 is a diagram illustrating a side schematic view of a lock assembly of a wireless access control system and a remote access device of the wireless access control system carried by a user in accordance with an embodiment.
Figure 2:
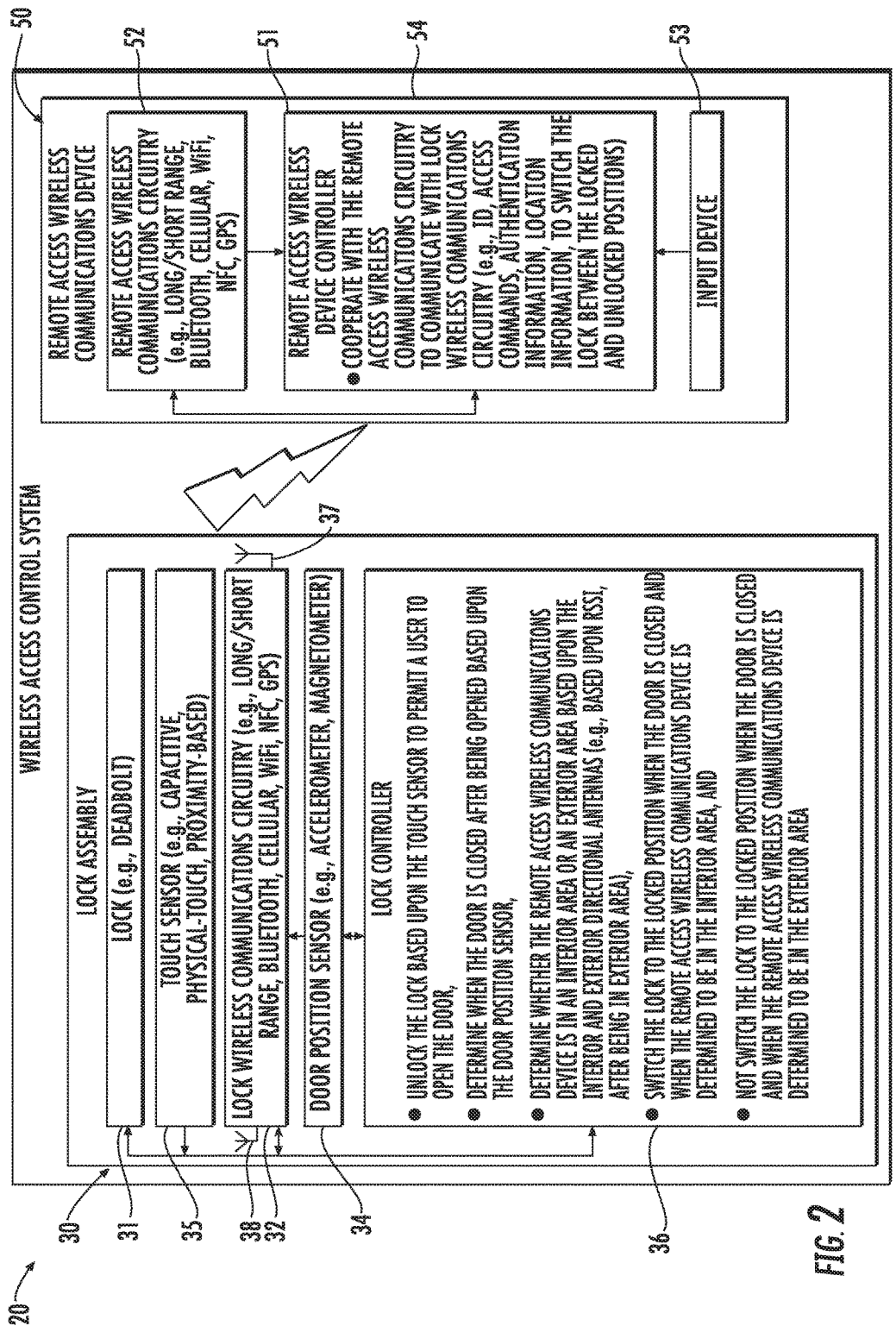
FIG. 2 is a schematic block diagram of the wireless access control system of FIG. 1.

Referring initially to FIGS. 1 and 2, a wireless access control system 20 for a door 21 may include a lock assembly 30 carried by the door. The door 21 may be an interior door, exterior door, overhead garage door, a door to a structure, overhead door, sliding door, screen door, revolving door, for example, a home or business, or any other door that separates an area where protection of that area may be desirable.

The lock assembly 30 may be considered a smart lock and illustratively includes a lock 31 switchable between a locked position and an unlocked position, lock wireless communications circuitry 32, and a door position sensor 34. The lock 31 may be cylinder lock, a deadbolt, or other type of lock, as will be appreciated by those skilled in the art. In some embodiments, the lock 31 may accept a physical key, for example, for manual or key operation of the lock. The lock assembly 30 is illustratively exposed on both the interior and exterior of the door 21. It should be understood that the term interior may refer to the side of the door 21 that faces an area desirable of protection or secured space. For example, where the lock assembly 30 is carried by a door of a home, the interior side 41 is the side within the home, while the exterior side 42 is outside the home and may be accessible to people other than the home's inhabitants.

The lock wireless communications circuitry 32 may be configured to communicate via one or more short range wireless communications protocols, for example, Bluetooth, NFC, WLAN, or other communications protocols. The lock wireless communications circuitry 32 may also communicate via a long range communication protocol, for example, cellular, or global positioning system, or other long range communication protocol. The lock wireless communications circuitry 32 may communicate using either or both of one or more short and long range protocols, as will be appreciated by those skilled in the art.

The lock assembly 30 also includes interior and exterior directional antennas 37, 38 coupled to the lock wireless communications circuitry 32. The interior and exterior directional antennas are pointed or directed to interior and exterior areas 41, 42 respectively.

The lock assembly 30 also illustratively includes a door position sensor 34. The door position sensor 34 may include an accelerometer, for example. The door position sensor 34 may also include a magnetometer. In some embodiments, the door position sensor 34 may include both an accelerometer and a magnetometer, or other and/or additional devices, sensors, or circuitry configured to sense a position of the door 21. For example, the door position sensor 34 may determine when the door 21 has been opened and/or closed, moved, stationary, etc. A pattern of movement of the door 21 can be determined, for example, opened and then closed, closed then opened, based upon the door position sensor 34.

The lock assembly 30 also illustratively includes a touch sensor 35 on the exterior of the lock assembly 30 to sense touching by a user 22. The touch sensor 35 may be a capacitive touch sensor, for example, and when the lock 31 includes a key hole, may be positioned around the key hole. The touch sensor 35 may be positioned elsewhere on the lock assembly 30. More than one touch sensor 35 may be used. For example, in some embodiments, the lock assembly 30 may include an interior touch sensor and an exterior touch sensor. Other types of touch sensors may also be used. For example, the touch sensor 35 may not necessarily sense touching directly from a user, but rather touching using an intervening object that may be an extension of the user. The lock 31 may be switched between the locked and unlocked positions based upon the touch sensor 35. For example, the user 22 may lock the door 21 by touching the touch sensor 35. Of course, as will be explained in further detail below, other pre-requisite events may have to occur prior to switching the lock 31.

The touch sensor 35 may be a physical-touch sensor for sensing physical contact with the user, for example. The touch sensor 35 may alternatively or additionally be a proximity-based touch sensor configured to sense proximity of the user thereto. In other words, while a touch sensor 35 is described herein, the touch sensor senses either a physical touch of the user or when the user is in a relatively close proximity to the touch sensor, for example, a small distance from the lock assembly 30 (e.g., less than 12 inches), such as by an access card reader, a FOB reader, or other circuitry to sense a user within a relatively small distance from the lock assembly 30 or door 21.

The wireless access control system 20 also illustratively includes a remote access device 50 remote from the lock assembly 30. The remote access device 50 includes a remote access device controller 51 and remote access wireless communications circuitry 52 coupled to the remote access device controller 51. The remote access device controller 51 and the remote access device wireless communications circuitry 52 cooperate to communicate with the lock wireless communications circuitry 32. For example, the remote access device controller 51 and the remote access device wireless communications circuitry 52 cooperate to communicate access commands, location information, authentication information, and/or other information for communicating with and controlling operation of the lock 31, and/or other devices that may be included in the wireless access control system 20, as will be appreciated by those skilled in the art. The remote access device controller 51 may also communicate with the lock wireless communications circuitry 32 for switching said lock between the locked and unlocked positions. Similar to the lock wireless communication circuitry 32, the remote access device wireless communications circuitry 52 may communicate using one or both of short range and long range communications protocols.

The remote access device 50 may be in the form of a fob or keychain, and may include housing 54 carrying a battery for powering the remote access device controller 51 and wireless communications circuitry 52, and at least one input device 53 carried by the housing and coupled to the remote access device controller 51. In other embodiments, the remote access device 50 may be a cellular telephone, tablet PC, or any other portable wireless communications device. The lock assembly 30 further includes a lock controller 36 coupled to lock 31, the lock wireless communications circuitry 32, the door position sensor 34, and the touch sensor 35.

Figure 3:
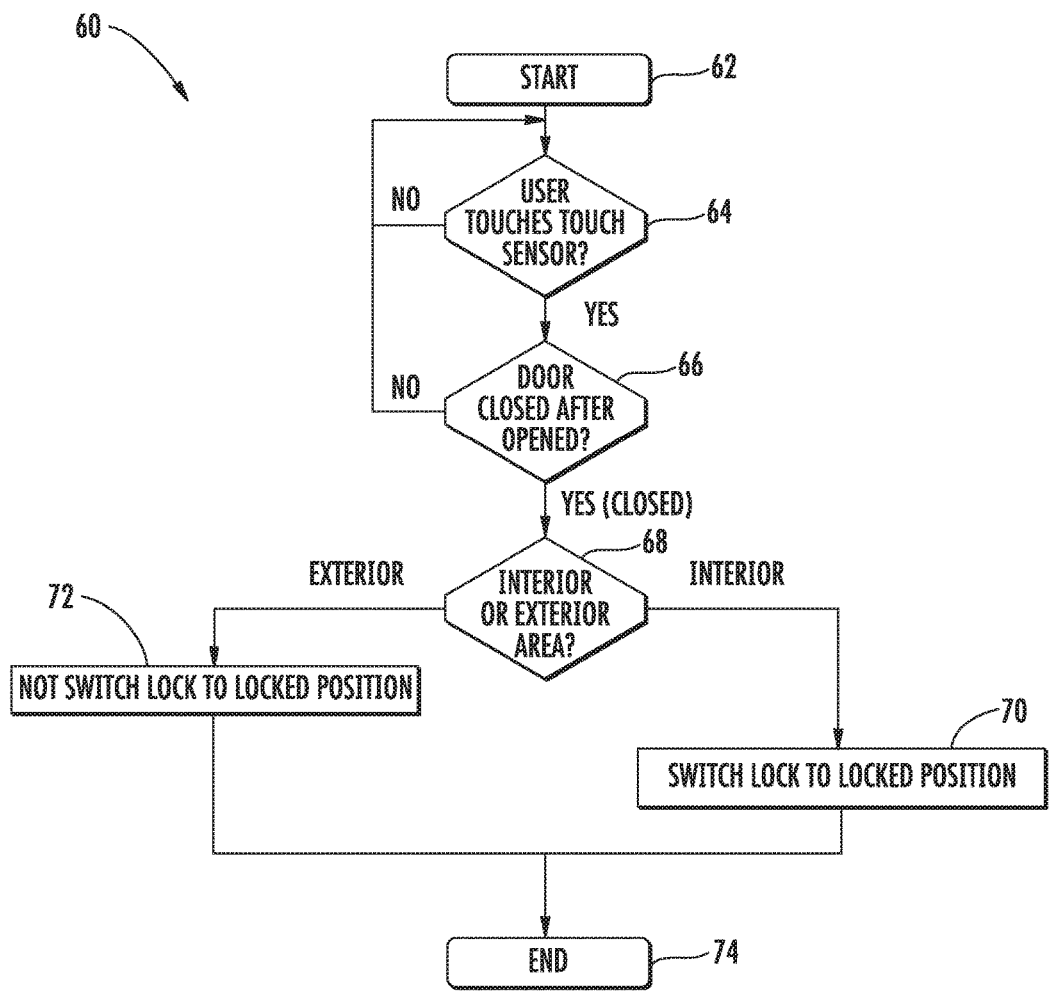
FIG. 3 is a flowchart illustrating operation of the wireless access control system of FIG. 1.

Referring now additionally to the flowchart 60 in FIG. 3, beginning at Block 62, operation of the wireless access control system 20 will be described. The lock controller 36 is configured to unlock the lock based upon the touch sensor 35 to permit a user to open the door 21. If, for example, the user activates the touch sensor 35 (Block 64), the lock controller 36 determines when the door 21 is closed after being opened based upon the door position sensor 34 (Block 66). In some embodiments, the lock controller 36 may "wake-up" from a low power mode and begin scanning for an advertising remote access wireless communications device 50 based upon the door position sensor 34 or motion of the door 21.

If, after the lock controller 36 determines that the door 21 is closed after being opened (Block 66), the lock controller determines whether the remote access wireless device 50 is in an interior area 41 or an exterior area 42 based upon the interior and exterior directional antennas 37, 38 (Block 68). The lock controller 36 may determine whether the remote access wireless device 50 is in the interior area 41 or the exterior area 42 based upon a received signal strength indicator (RSSI) from the interior and exterior directional antennas 37, 38, for example. Of course, other factors may alternatively or additionally be used to determine whether the remote access wireless device 50 is in the interior or exterior area 41, 42, for example, based upon position data determined from triangulation or a global positioning system. In some embodiments, the RSSI may be used to determine a direction of motion of the remote access wireless communications device 50, for example, whether the remote access wireless communications device is moving away from the lock assembly 30.

When the door 21 is closed (Block 66) and when the remote access wireless device 50 is determined to be in the interior area 41 (Block 68), and in some embodiments, also moving away from the lock assembly 30, at Block 70 the lock controller 36 switches the lock 31 to the locked position. In some embodiments, the lock controller 36 may switch the lock 31 to the locked position when the remote access wireless device is determined to be in the interior area 41 after being in the exterior area 42, for example, as may occur after the user arrives at their home. When the door 21 is closed (Block 66) and when the remote access wireless device 50 is determined to be in the exterior area 42 (Block 68), the lock controller does not switch the lock 31 to the locked position (Block 72). The method ends at Block 74.

The above-described may be particularly advantageous for "auto-locking" based upon the determined intent of the user, specifically, arriving at home. More particular, the wireless access control system 20 may be particularly advantageous for determining whether the user 22 has arrived at home, for example, and thus, lock events, such as switching the lock to the locked position, may be based upon the determined events. This may increase user convenience while maintaining security, for example.

Figure 4:
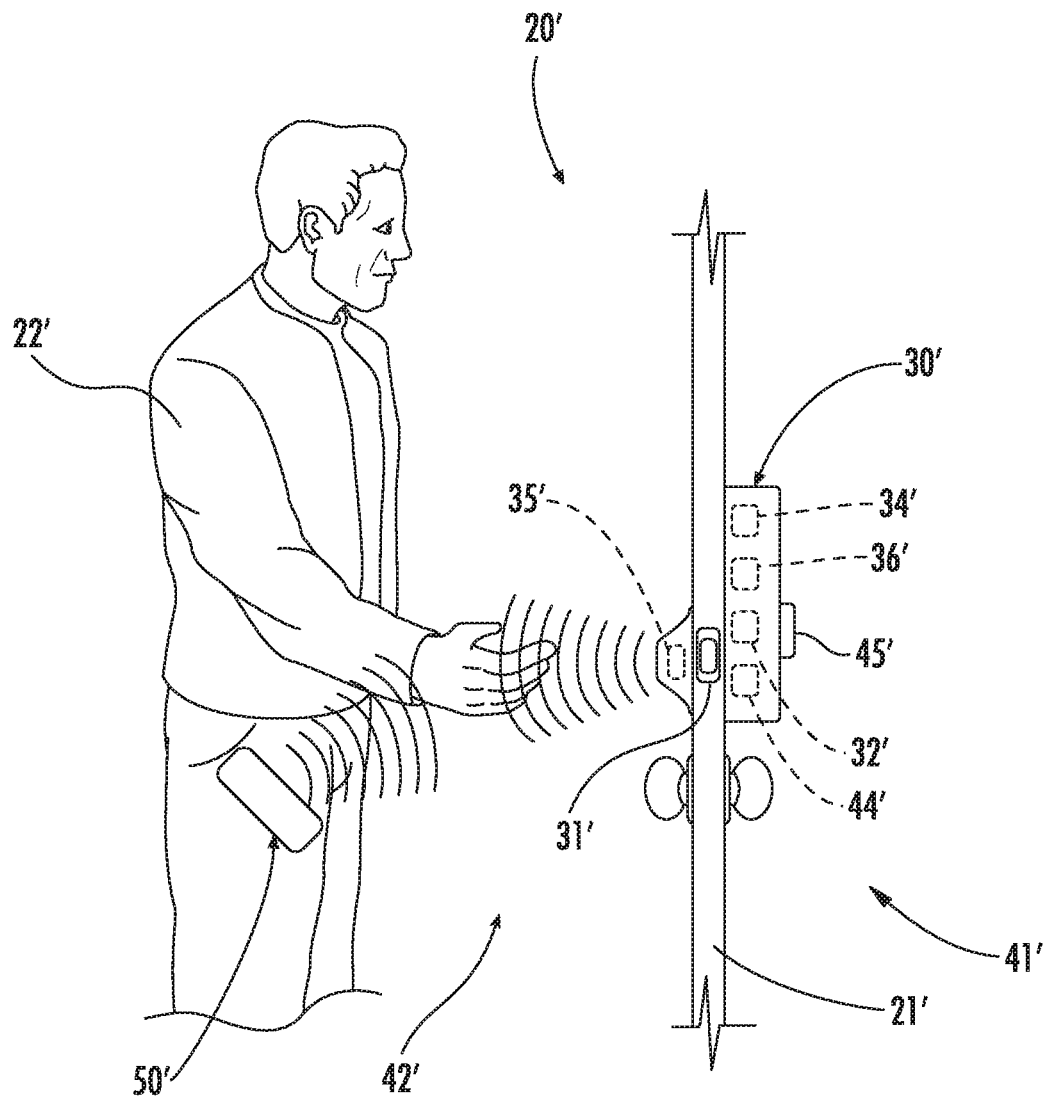
FIG. 4 is a diagram illustrating a side schematic view of a lock assembly of a wireless access control system and a remote access device of the wireless access control system carried by a user in accordance with another embodiment.
Figure 5:
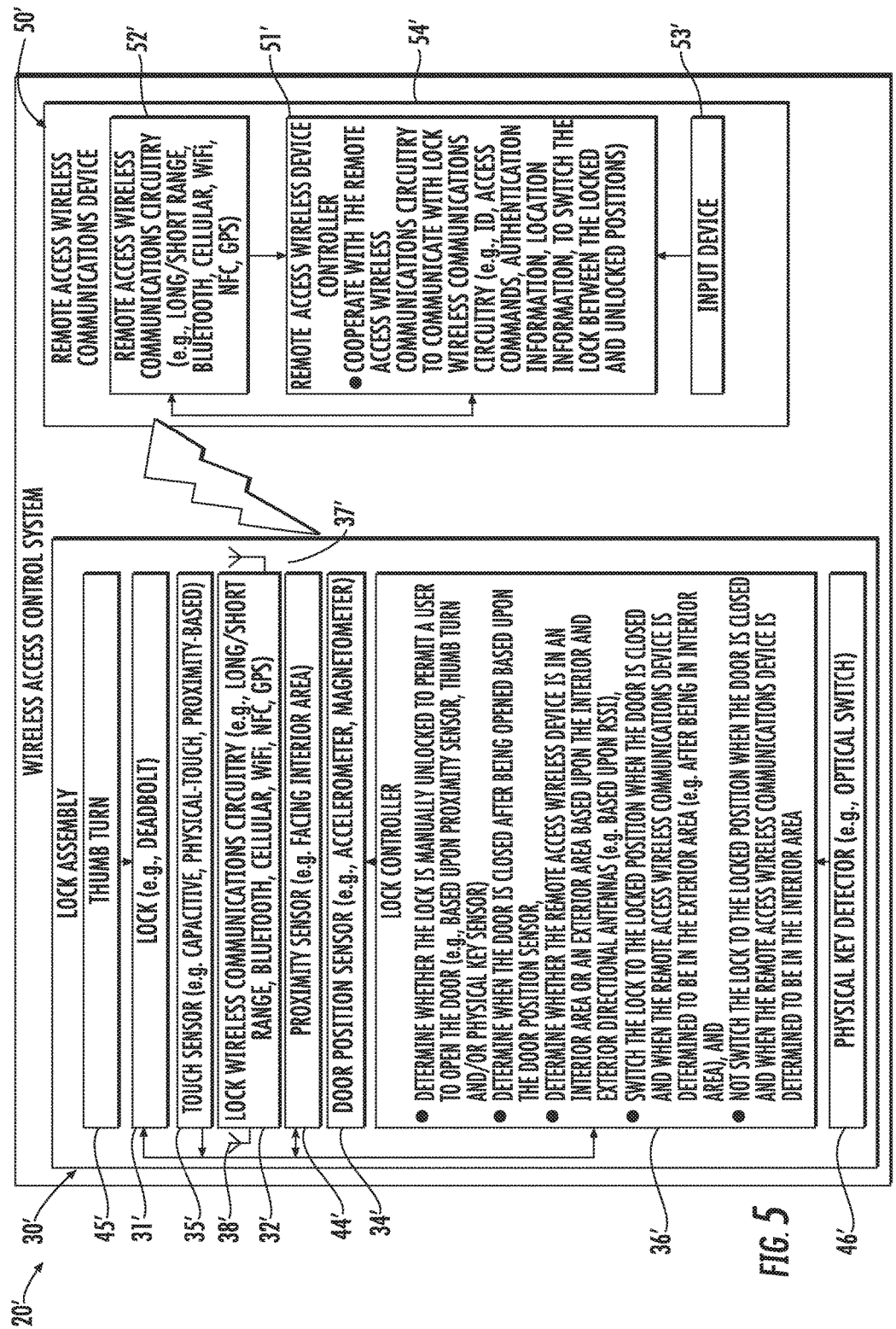
FIG. 5 is a schematic block diagram of the wireless access control system of FIG. 4.
Figure 6:
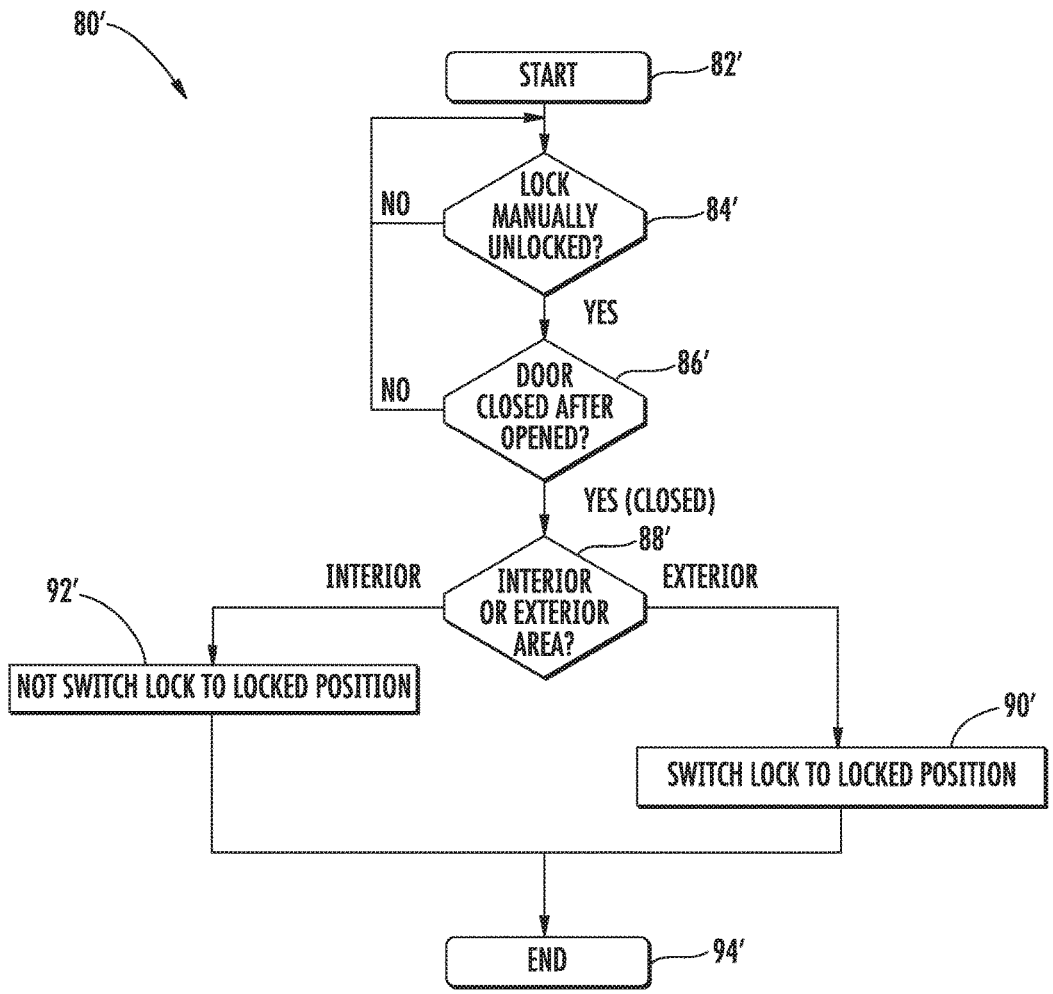
FIG. 6 is a flowchart illustrating operation of the wireless access control system of FIG. 4.

Referring now to FIGS. 4-6, in another embodiment, the lock assembly 30' includes a proximity sensor 44' coupled to the lock controller 36' and facing the interior area 41'. In some embodiments, the proximity detector 44' may be facing the exterior area 42' or both the interior 41' and exterior areas. It should be understood by those skilled in the art that the proximity sensor 44' may be another physical sensor separate from the touch sensor 35 described above, or may embody the same functionality as the touch sensor described above. More than one proximity and/or touch sensor 44', 35' may be used either alone or in combination.

Beginning at Block 82' in the flowchart 80', the lock controller 36' determines whether the lock 31' is manually unlocked to permit the user 22' to open the door 21' (Block 84'). The lock controller 36' may determine whether the lock 31' is manually unlocked based upon the proximity sensor 44'. For example, the lock controller 36' may determine whether the lock 31' has been unlocked based upon sensed movement of the lock including its components, and/or detecting the user's presence adjacent the lock.

The lock assembly 30' may also include a thumb turn 45' coupled to the lock 31'. The thumb turn 45' may be a handle or other structure that when grasped and rotated by the user 22' allows the lock 31' to be manually switched between the locked and unlocked positions, as will be appreciated by those skilled in the art. The lock controller 36' may alternatively or additionally determine whether the lock 31' has been unlocked based upon movement of the thumb turn 45'. For example, when the thumb turn 45' is manually moved, a Hall Effect sensor may sense the position of the thumb turn or the lock components, similarly to the proximity sensor 44' described above. In some embodiments, the lock controller 36' may determine whether the lock 31' is manually unlocked based upon the operation of the thumb turn 45' within a threshold time period of sensing the user based upon the proximity sensor 44'. For example, if the proximity sensor 44' senses the user 22' and within a threshold time period from sensing the thumb turn 45' being manually operated, the lock controller 36' may determine that the lock 31' has been manually unlocked.

In other embodiments, the lock assembly 30' may include a physical key detector 46' coupled to the lock controller 36'. The physical key detector 46' may include an optical sensor, for example, a light emitting diode (LED), a laser, and/or a photodiode. The lock controller 36' may determine whether the lock 31' is manually unlocked based upon the physical key detector 46'. While several components and techniques have been described herein for determining whether the lock 31' has been manually unlocked, it should be appreciated by those skilled in the art that any number of techniques may be used, for example, those described herein, either alone or in combination. Additional techniques may also be used for the determination.

At Block 86', the lock controller 36' determines when the door 21' is closed after being opened based upon the door position sensor 34'. The lock controller 36' also determines whether the remote access wireless device 50' is in an interior area 41' or an exterior area 42' based upon the interior and exterior directional antennas 37', 38', and more particularly based upon the RSSI therefrom (Block 88'). Of course, other factors may alternatively or additionally be used to determine whether the remote access wireless device 50' is in the interior or exterior area 41', 42', for example, based upon position data determined from triangulation or a global positioning system.

When the door 21' is closed (Block 86') and when the remote access wireless device 50' is determined by the lock controller 36' to be in the exterior area 42', at Block 88', the lock controller switches the lock 31' to the locked position (Block 90'). In some embodiments, the lock controller 36' may switch the lock 21' to the locked position when the remote access wireless device 50' is determined to be in the exterior area 42' after being in the interior area 41', for example, as may occur after the user leaves their home.

When the door 21' is closed (Block 86') and when the remote access wireless device 50' is determined to be in the interior area 41' (Block 88'), the lock controller 36' does not switch the lock 21' to the locked position (Block 92'). The method ends at Block 94'.

As will be appreciated by those skilled in the art, the above-described may be particularly advantageous for "auto-locking" based upon the determined intent of the user, specifically, leaving the home. More particularly, the wireless access control system 20' may be advantageous for determining whether the user 22' has left the home, for example, and thus, lock events, such as switching the lock to the locked position, may be based upon the determined events. This may increase user convenience while maintaining security, for example.

While several embodiments have been described herein, and more particularly, locking of the lock based upon user arrival or user departure, it will be appreciated that some or all of the techniques and methods described with respect to "user arrival" may apply to "user departure" and vice versa. Moreover, many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A wireless access control system comprising:
    a remote access wireless communications device; and
    a lock assembly to be mounted on a door remotely from said remote access wireless communications device, said lock assembly comprising a lock switchable between locked and unlocked positions, a door position sensor, interior and exterior directional antennas, lock wireless communications circuitry coupled to said interior and exterior directional antennas, a touch sensor, and a lock controller coupled to said lock, said door position sensor, said lock wireless communications circuitry, and said touch sensor;
    said lock controller configured to
        (a) unlock the lock based upon said touch sensor to permit a user to open the door,
        (b) determine when the door is closed after being opened based upon said door position sensor and after (a),
        (c) determine whether said remote access wireless device is in an interior area or an exterior area based upon said interior and exterior directional antennas and after (b),
        (d) switch said lock to the locked position when the door is closed after (c) and when said remote access wireless communications device is determined to be in the interior area, and
        (e) not switch said lock to the locked position when the door is closed after (c) and when said remote access wireless communications device is determined to be in the exterior area.

2. The wireless access control system of claim 1 wherein said lock controller is configured to determine whether said remote access wireless device is in the interior area or the exterior area based upon a received signal strength indicator (RSSI) from said interior and exterior directional antennas.

3. The wireless access control system of claim 1 wherein said lock controller is configured to switch said lock to the locked position when said remote access wireless device is determined to be in the interior area after being in the exterior area.

4. The wireless access control system of claim 1 wherein said touch sensor comprises a physical-touch sensor configured to sense physical contact with the user.

5. The wireless access control system of claim 1 wherein said touch sensor comprises a proximity-based touch sensor configured to sense a proximity of the user thereto.

6. The wireless access control system of claim 1 wherein said door position sensor comprises an accelerometer.

7. The wireless access control system of claim 1 wherein said door position sensor comprises a magnetometer.

8. The wireless access control system of claim 1 wherein said remote access wireless communications device comprises remote access wireless communications circuitry and a remote access controller coupled thereto; and wherein said remote access controller is configured to communicate via said remote access wireless communications circuitry with said lock wireless communications circuitry for switching said lock between the locked and unlocked positions.

9. A lock assembly for a wireless access control system comprising a remote access wireless communications device, the lock assembly to be mounted on a door remotely from the remote access wireless communications device and comprising:
    a lock switchable between locked and unlocked positions;
    a door position sensor;
    interior and exterior directional antennas;
    lock wireless communications circuitry coupled to said interior and exterior directional antennas;
    a touch sensor; and
    a lock controller coupled to said lock, said door position sensor, said lock wireless communications circuitry, and said touch sensor;
    said lock controller configured to
        (a) unlock the lock based upon said touch sensor to permit a user to open the door,
        (b) determine when the door is closed after being opened based upon said door position sensor and after (a),
        (c) determine whether the remote access wireless device is in an interior area or an exterior area based upon said interior and exterior directional antennas and after (b),
        (d) switch said lock to the locked position when the door is closed after (c) and when the remote access wireless communications device is determined to be in the interior area, and
        (e) not switch said lock to the locked position when the door is closed after (c) and when the remote access wireless communications device is determined to be in the exterior area.

10. The lock assembly of claim 9 wherein said lock controller is configured to determine whether said remote access wireless device is in the interior area or the exterior area based upon a received signal strength indicator (RSSI) from said interior and exterior directional antennas.

11. The lock assembly of claim 9 wherein said lock controller is configured to switch said lock to the locked position when the remote access wireless device is determined to be in the interior area after being in the exterior area.

12. The lock assembly of claim 9 wherein said touch sensor comprises a physical-touch sensor configured to sense physical contact with the user.

13. The lock assembly of claim 9 wherein said touch sensor comprises a proximity-based touch sensor configured to sense a proximity of the user thereto.

14. The lock assembly of claim 9 wherein said door position sensor comprises an accelerometer.

15. The lock assembly of claim 9 wherein said door position sensor comprises a magnetometer.

16. A method of controlling access in a wireless access control system comprising a remote access wireless communications device, and a lock assembly to be mounted on a door remotely from the remote access wireless communications device, the lock assembly comprising a lock switchable between locked and unlocked positions, a door position sensor, interior and exterior directional antennas, lock wireless communications circuitry coupled to the interior and exterior directional antennas, a touch sensor, and a lock controller coupled to the lock, the door position sensor, the lock wireless communications circuitry, and the touch sensor, the method comprising:
   using the lock controller to
   (a) unlock the lock based upon the touch sensor to permit a user to open the door,
   (b) determine when the door is closed after being opened based upon the door position sensor and after (a),
   (c) determine whether the remote access wireless device is in an interior area or an exterior area based upon the interior and exterior directional antennas and after (b),
   (d) switch the lock to the locked position when the door is closed after (c) and when the remote access wireless communications device is determined to be in the interior area, and
   (e) not switch the lock to the locked position when the door is closed after (c) and when the remote access wireless communications device is determined to be in the exterior area.

17. The method of claim 16 wherein the lock controller is used to determine whether the remote access wireless device is in the interior area or the exterior area based upon a received signal strength indicator (RSSI) from the interior and exterior directional antennas.

18. The method of claim 16 wherein the lock controller is used to switch the lock to the locked position when the remote access wireless device is determined to be in the interior area after being in the exterior area.

19. The method of claim 16 wherein the touch sensor comprises a physical-touch sensor configured to sense physical contact with the user.

20. The method of claim 16 wherein the touch sensor comprises a proximity-based touch sensor configured to sense a proximity of the user thereto.

21. The method of claim 16 wherein the remote access wireless communications device comprises remote access wireless communications circuitry and a remote access controller coupled thereto; and wherein the remote access controller is used to communicate via the remote access wireless communications circuitry with the lock wireless communications circuitry for switching the lock between the locked and unlocked positions.

\* \* \* \* \*